Nov. 9, 1954 W. ENGLISH 2,693,891

ELEVATING AND DUMPING EQUIPMENT

Filed March 18, 1952 3 Sheets-Sheet 1

WEBER ENGLISH
INVENTOR

BY Loyal H. McCarthy
ATTORNEY.

WEBER ENGLISH
INVENTOR.

BY Loyal H. McCarthy
ATTORNEY.

Nov. 9, 1954 W. ENGLISH 2,693,891
ELEVATING AND DUMPING EQUIPMENT
Filed March 18, 1952 3 Sheets-Sheet 3
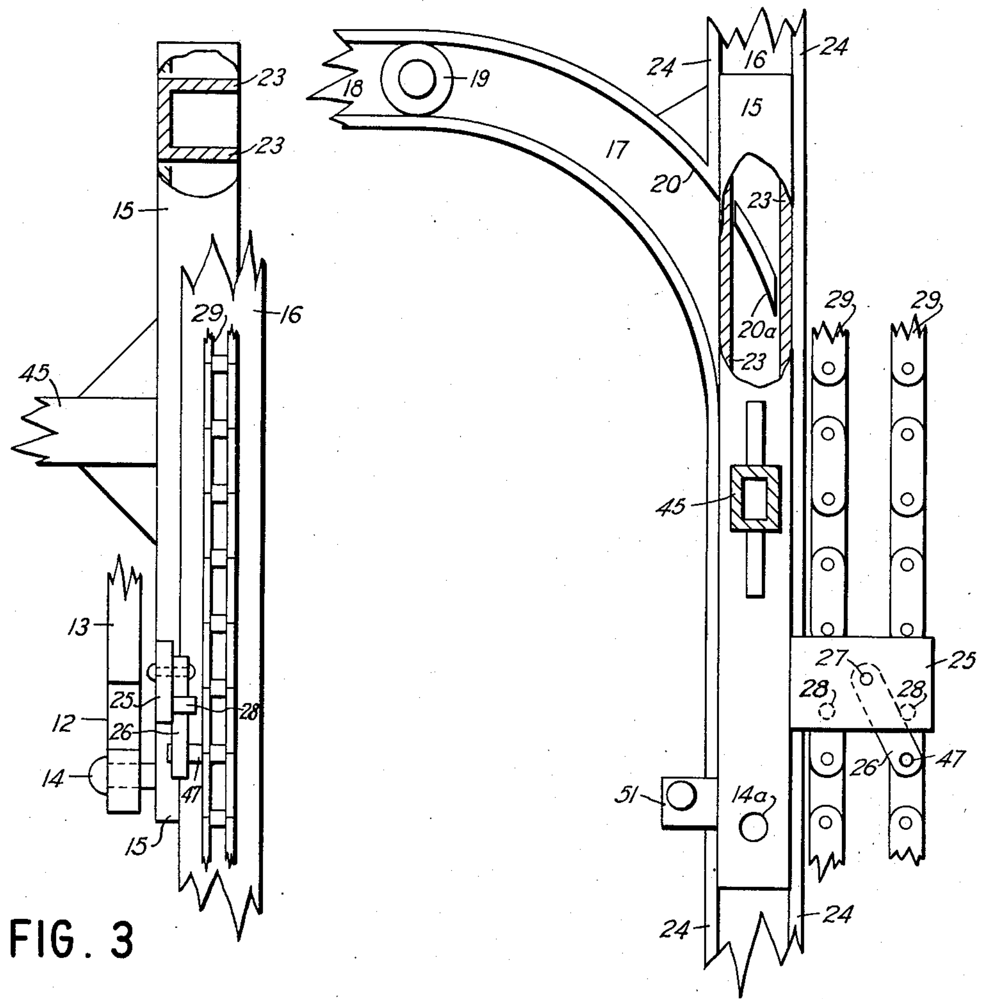
FIG. 3
FIG. 4
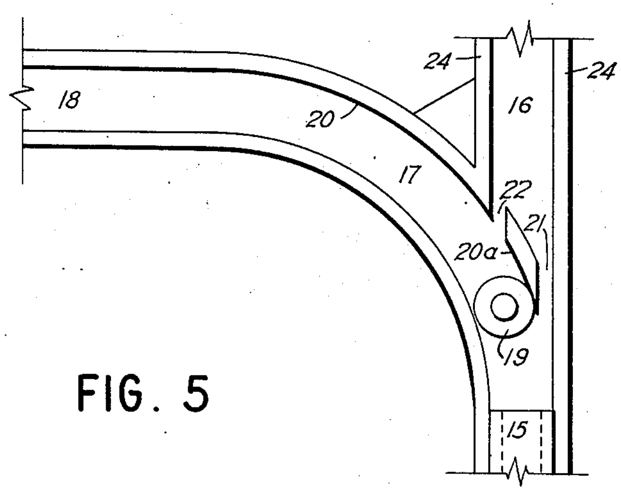
FIG. 5
WEBER ENGLISH
INVENTOR.
BY Loyal H. McCarthy
ATTORNEY.

United States Patent Office 2,693,891

Patented Nov. 9, 1954

2,693,891

ELEVATING AND DUMPING EQUIPMENT

Weber English, Elgin, Oreg.

Application March 18, 1952, Serial No. 277,323

6 Claims. (Cl. 214—708)

My invention relates to providing improvements in elevating and dumping devices and equipment such as is used in seed processing plants in which a receptacle adapted to receive seed of grain, or a box or container holding seed or grain, is elevated to a suitable height and then tilted to dump the contents into an elevated hopper.

One object of my invention is to provide means adapted to hoist the elevating receptacle to the desired height, tilt it outward and over the receiving hopper for unloading, and then reverse the entire process, and return the elevating receptacle to its starting point in one continuous cycle of operation.

Another object of my invention is to provide mechanism that will perform its entire cycle of operation while the source of power rotates uniformly in only one direction.

Still another object of my invention is to provide mechanism capable of turning the elevating receptacle and its contents practically upside down for discharging the seed or grain into the receiving hopper.

Also still another object of my invention is to provide means for carrying the elevating receptacle a substantial distance over the proximal edge of the receiving hopper before dumping the contents of the elevating receptacle.

Referring to the drawings:

Fig. 3 is a detail view of a slide member, a portion of the frame, channel guide member, chain and other connecting parts.

Fig. 4 is a detail view of a slide member showing its connection with an elevating chain and showing said slide member in relation to the junction of a vertical and quadrantal channel guide track member.

Fig. 5 shows in detail the junction of a vertical and quadrantal guide track.

Figure 1:
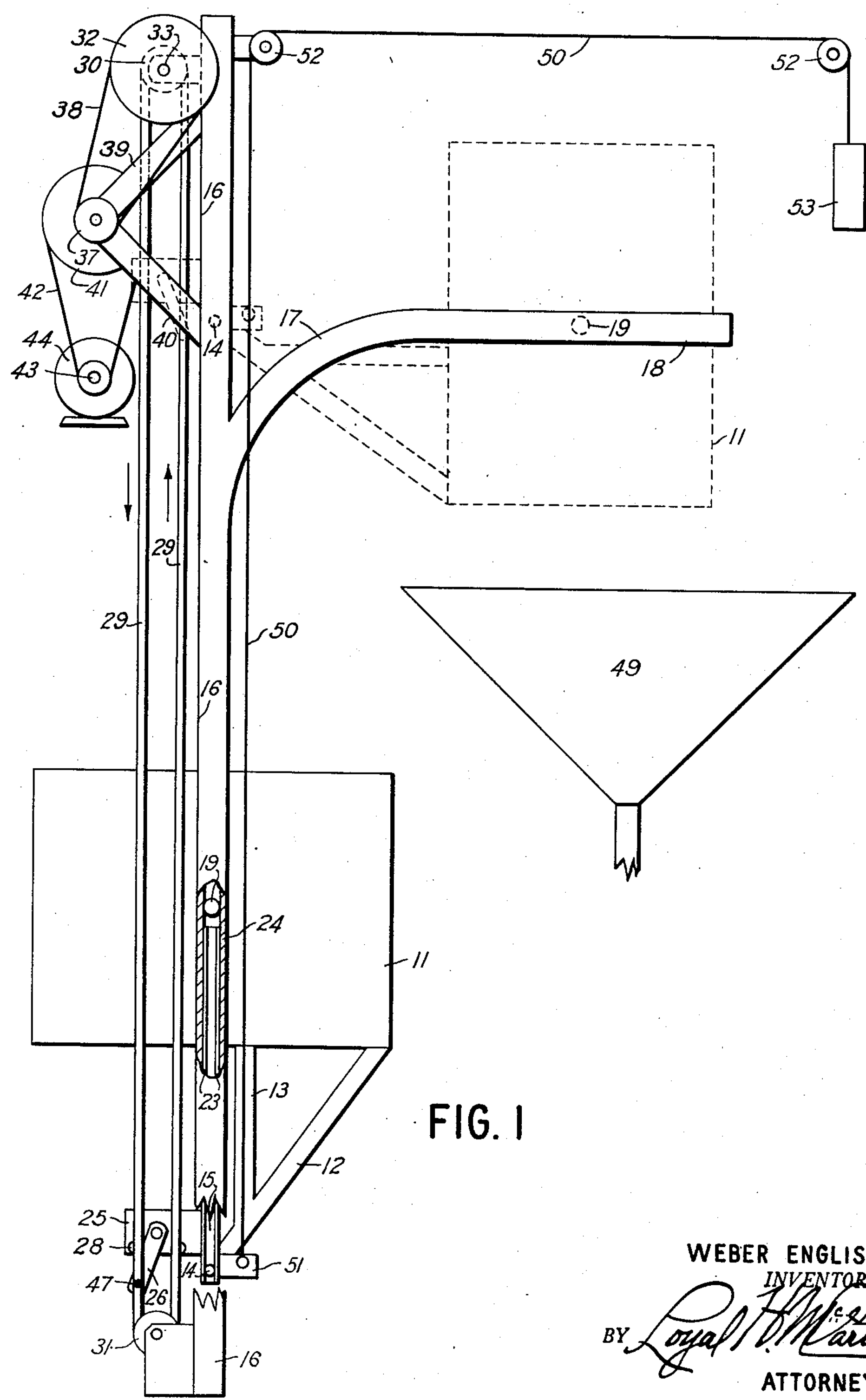
Fig. 1 is a side elevation of a machine containing my improvements.

Referring further to the drawings:

It is to be understood that the device as shown in Fig. 1 is symmetrical about a vertical plane directed from front to back, so that elements indicated in Fig. 1 and described with reference thereto will have counterparts on the opposite side of the device, exceptions being the source of power and adjacent transmission means.

An elevating receptacle 11, adapted to receive seeds or a container for seeds, is supported by frame members 12 and 13 which are pivotally mounted at a point 14, a substantial predetermined distance below the bottom of the elevating receptacle 11, to a slide 15 of U section which is slidable in vertical U-shaped guide track, broken sections of which are shown at 16, 16, 16.

The elevating receptacle 11, carries central rollers 19, designed to enter the channel of vertical guide tracks 16, quadrantal guide tracks 17 and horizontal guide tracks 18; rollers 19 being adapted to prevent and upon proper occasions to impart rocking motion to the elevating receptacle 11 about pivots 14.

At the junction of quadrantal guide track 17 and vertical guide tracks 16 (Figs. 1 and 5) a segmental portion **20*a* of the upper flange 20 of quadrantal guide track 17 lying within the flanges 24, 24 of vertical guide track 16 is adapted to shunt roller 19 into the channel of quadrantal guide track 17; however slots 21 and 22 are provided as shown in Fig. 5 to allow the passage of flanges 23 (see Fig. 1) of slide 15 in its upward travel within the channel of guide track 16. Near the lower end of the slide 15 is a plate 25 which carries a stud 27 about which a link 26 pivots, having its arc of swing limited by stops 28, 28 fixed to plate 25. A stud 47 rotatable in the lower end of link 26 is rigidly attached to a vertical elevating sprocket chain 29, the articulation of link 26 allowing it to align itself with either the ascending or descending portions of the endless elevating sprocket chain 29**.

Elevating sprocket chain 29 extends vertically parallel with and in front of guide track 16 for practically its entire height and passes over a drive sprocket 30 at the top and an idler sprocket 31 near the bottom of said guide track 16.

Figure 2:
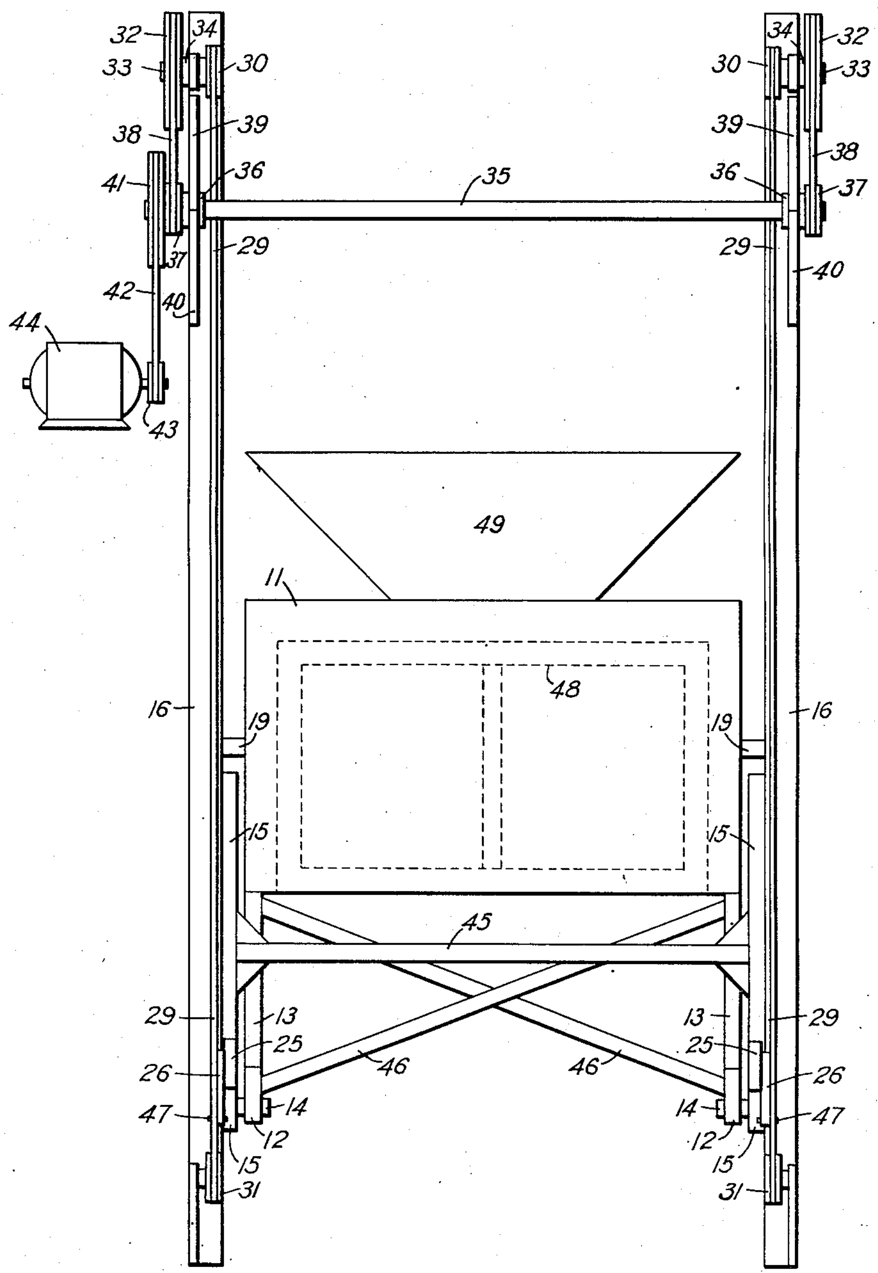
Fig. 2 is a front view of my improved machine.

Referring to Fig. 2: shafts 33, 33 journaled in bearings 34, 34 attached to guide tracks 16, 16 mount sprockets 30, 30 on their inner ends and sprockets 32, 32 on their outer ends. A transverse shaft 35 mounting sprockets 37, 37 and 41 is journaled in bearings 36, 36 carried on frame members 39 and 40, 39 and 40 (see Figs. 1 and 2) attached to guide tracks 16, 16.

Chains 38, 38 pass around sprockets 32 and 37, 32 and 37 to synchronize sprockets 32, 32, sprockets 30, 30 and elevating chains 29, 29 each with its counterpart.

A suitable source of power, such as sprocket 41, chain 42 and motor 44, carrying a sprocket 43 may be used to drive shaft 35. A transverse bar 45 is attached to slides 15, 15, as shown in Fig. 2, to tie the slides into a solid unit. Crossed bars 46, 46 attached to frame members 12 and 13, 12 and 13 serve to brace said frame members. The position of a container box 48 is shown by dotted lines within the confines of the elevating receptacle 11.

Referring again to Fig. 1: a cable 50 having one end secured to a plate 51 projecting from slide 15 passes upward, thence horizontally over pulley wheels 52, 52 and finally downward where it connects with counterweight 53.

In operation of my improved device the direction of travel of the vertical endless elevating chain 29 is as shown by the arrows. By assuming the start of the operation with the elevating receptacle 11 as shown in Fig. 1 the stud 47 follows the entire path of the elevating chain 29 first downward around sprocket 31 thence upward parallel with the guide track 16, thence over sprocket 30 and finally downward to the starting point. By reason of its pivotal connections with elevating chain 29, through the link 26 the slide plate 15 is carried upward as controlled by the channel guide track 16 to a point beyond the junction of the guide track 16 with that of the quadrantal guide track 17. During the same operation, the roller 19 is shunted off in its course of travel into the quadrantal guide track 17 by means of the flange **20*a* as shown in Fig. 5, to initiate the tilting of the elevating receptacle 11 over the hopper 49. With the continued rise of slide 15, its flanges pass through slots 21 and 22 the course of said slide being controlled by the vertical guide track 16 while roller 19 passes through quadrantal guide track 17 and into horizontal guide track 18. The continued rise of pivot 14 with slide 15 causes the elevating receptacle 11 and the retaining box 48 to be turned nearly upside down as stud 47, attached to chain 29, reaches the top of sprocket 30**.

After passing over the top of sprocket 30, in its downward course, stud 47, rigidly attached to chain 29, causes the entire initial action to be reversed to return the elevating receptacle 11 and the emptied box 48 to the starting point in one continuous action of the endless chain 29.

To prevent the elevating receptacle 11 from descending too fast, the counter-weight 53, connecting with the plate 51, projecting from the slide 15, operates as a counterbalancing influence against the tendency for too rapid a descent of the elevating receptacle.

Having thus described my invention, I claim:

1. In elevating mechanism: an elevating receptacle; receptacle elevating chains; pivotal connection between the elevating chains and the elevating receptacle; a pair of channel upright receptacle guide tracks; a pair of channel arcuate receptacle guide tracks; a switch frog at the junction of each channel arcuate receptacle guide track with its respective upright channel receptacle guide track; a sliding elevating receptacle guiding plate member operating within each upright channel guide track; pivotal connection between each guiding plate member and the elevating receptacle; additional roller pivot members connecting each side of the elevating receptacle with its respective guide channel tracks, said additional roller pivot members operating within the arcuate channel guide tracks, also within that portion of the vertical guide tracks below the junction of the arcuate channel guide tracks and within the horizontal channel guide tracks.

2. In elevating mechanism comprising an elevating receptacle, pivotally connected to two uni-directional elevator chains and two substantially vertical channel guide tracks which in turn connect with quadrantal channel guide tracks which quadrantal guide tracks in turn connect with substantially horizontal channel guide tracks: a supporting frame below the elevating receptacle; a guide slide operating only in its respective vertical channel guide track at each side of the elevating receptacle; a plate at each side of the elevating receptacle, rigidly connected to its respective guide slide, pivotally connected with the elevating receptacle and also with its respective elevator chain; a centrally located roller on each side of the elevating receptacle, operating within its respective vertical channel guide track, its respective quadrantal guide track and its respective horizontal channel guide track; and a shunt frog within the channel of each vertical channel guide track at its junction with its respective quadrantal guide track.

3. In elevating mechanism comprising an elevating receptacle pivotally connected with two uni-directional elevator chains and two substantially vertical channel guide tracks which in turn connect with quadrantal guide tracks and which quadrantal guide tracks also in turn connect with substantially horizontal guide tracks: a guide slide at each side of the elevating receptacle operating only in the vertical guide track; a pivotal connection of each side of the elevating receptacle with its guiding means, operating only in the vertical guide track; an additional pivotal connection of each side of the elevating receptacle with its respective guide channel which operates within the vertical channel guide track, the quadrantal guide track and the horizontal channel guide track; and a shunt frog in the channel of each vertical guide track at its junction with its respective quadrantal guide track.

4. In elevating mechanism comprising an elevating receptacle; unidirectional elevating chains; two substantially vertical channel shaped guide tracks; diversionary quadrantal guide tracks, extending from the vertical guide tracks; substantially horizontal channel shaped guide tracks extending from the quadrantal guide tracks; a channel shaped slide member operating within the channel of each vertical guide track; a pivotal mounting means on each channel shaped slide member, providing pivotal connection with the supporting frame of the elevating receptacle a substantial distance below the bottom of the elevating receptacle; a central roller on each side of the elevating receptacle, operating within the channel of its respective vertical guide track, within the channel of its respective quadrantal guide track and within the channel of its respective horizontal guide track; a segmental portion of the upper flange of the channel of the quadrantal guide track within the channel of the vertical guide track so spaced between its ends and the flanges of the vertical guide track as to permit the passing of the channel shaped slide member beyond the junction of the quadrantal guide track with its respective vertical guide track but not sufficiently spaced to permit the central roller on the side of the elevating receptacle to pass upwardly in the vertical guide channel beyond its junction with its respective quadrantal guide track thereby shunting said roller into the channel of the quadrantal guide track.

5. In elevating mechaninsm: an elevating receptacle, controlled by and operating between two vertical channel guide tracks, two quadrantal channel guide tracks and two horizontal channel guide tracks; the two vertical channel guide tracks, the two quadrantal guide tracks and the two horizontal channel guide tracks just described; a segmental portion of the upper flange of the quadrantal channel guide track, at the junction of said quadrantal channel guide track with its respective vertical channel guide track and within the channel of said vertical channel guide track, said segmental portion of the upper flange of the quadrantal channel guide track being so spaced between its ends and the flanges of its respective vertical channel guide track as to permit passage of a slide element operating in the vertical channel guide track beyond the junction of the quadrantal channel guide track with the vertical channel guide track; a slide element operating only within the vertical channel guide track; pivotal connection between the slide element and the supporting frame of the elevating receptacle at a point a substantial distance below the bottom of the elevating receptacle; a supporting frame below the elevating receptacle; a roller attached to each side of the elevating receptacle, operating within the vertical channel guide track, the quadrantal channel guide track and the horizontal channel guide track; and means for elevating and lowering the elevating receptacle.

6. In elevating equipment: two substantially vertical receptacle control guide tracks; two quadrantal channel guide tracks; an elevating receptacle; a receptacle supporting framework projecting a substantial distance below the elevating receptacle; a slide guide operating in each vertical channel guide track, pivotally connected to the supporting framework of the elevating receptable a substantial distance below the bottom of the elevating receptacle; a segmental portion of the upper flange of the quadrantal guide track, lying wholly within the channel between the flanges of each vertical channel guide track, so spaced from the flanges of the vertical channel guide track as to permit the passing of the slidable guide, pivotally attached to the supporting framework of the elevating receptacle; a guiding roller on each side of the elevating receptacle, a substantial distance above the bottom of said elevating receptacle, operating within the channel of both the vertical guide track and the quadrantal guide track.

References Cited in the file of this patent

UNITED STATES PATENTS

| Number | Name | Date |
|---|---|---|
| 545,177 | Sabroe | Aug. 27, 1895 |
| 719,258 | Ray | Jan. 27, 1903 |
| 1,487,196 | Bledsoe | Mar. 18, 1924 |
| 1,673,911 | Hale | June 19, 1928 |
| 1,687,278 | Allen | Oct. 9, 1928 |
| 2,581,067 | Avery | Jan. 1, 1952 |

FOREIGN PATENTS

| Number | Country | Date |
|---|---|---|
| 238,692 | Great Britain | Aug. 27, 1925 |
| 438,198 | Great Britain | Nov. 8, 1935 |